United States Patent [19]

Hoebel

[11] Patent Number: 5,657,654
[45] Date of Patent: Aug. 19, 1997

[54] ARRANGEMENT FOR LOCKING THE IGNITION KEY OF A MOTOR VEHICLE USING THE SELECTOR LEVER OF AN AUTOMATIC TRANSMISSION

[75] Inventor: Peter Hoebel, Neuhausen-Schellbronn, Germany

[73] Assignee: Dr. Ing. h.c.F. Porsche Ag, Weissach, Germany

[21] Appl. No.: 508,191

[22] Filed: Jul. 27, 1995

[30] Foreign Application Priority Data

Jul. 27, 1994 [DE] Germany ............ 44 26 533.6

[51] Int. Cl.⁶ .................................................. B60R 25/06
[52] U.S. Cl. .................. 70/247; 192/4 A; 477/96; 70/389; 70/248
[58] Field of Search ................. 70/256, 389, 245, 70/247, 248; 192/4 A; 477/96

[56] References Cited

U.S. PATENT DOCUMENTS

| | | | |
|---|---|---|---|
| 4,474,085 | 10/1984 | DeVogelaere et al. | |
| 4,936,158 | 6/1990 | Livshits et al. | |
| 4,942,748 | 7/1990 | McGough | 70/389 |
| 4,967,883 | 11/1990 | Kito et al. | 192/4 A |
| 5,085,096 | 2/1992 | Behrens | |
| 5,207,124 | 5/1993 | Anderson et al. | |
| 5,218,847 | 6/1993 | Dieden et al. | 70/247 |
| 5,226,303 | 7/1993 | Dieden et al. | 192/4 A |
| 5,293,763 | 3/1994 | Asano et al. | 70/248 |
| 5,309,744 | 5/1994 | Kito et al. | 70/247 |
| 5,379,871 | 1/1995 | Asano et al. | 192/4 A |
| 5,428,977 | 7/1995 | Knape | 70/247 |
| 5,489,246 | 2/1996 | Moody et al. | 192/4 A |
| 5,490,585 | 2/1996 | Togano | 192/4 A |

FOREIGN PATENT DOCUMENTS

| | | |
|---|---|---|
| 0 334 672 | 9/1989 | European Pat. Off. |
| 41 04 132 | 8/1992 | Germany . |
| 42 25 182 | 2/1994 | Germany . |
| 93 05 846.2 | 10/1994 | Germany . |
| 0106754 | 4/1989 | Japan .................. 70/248 |

Primary Examiner—Darnell M. Boucher
Attorney, Agent, or Firm—Evenson, McKeown, Edwards & Lenahan, P.L.L.C.

[57] ABSTRACT

An arrangement for locking the ignition key of a motor vehicle using the selector lever of an automatic transmission includes a locking element which engages via a guide nose in a guideway on the selector lever. The locking element is connected with an ignition lock by way of a cable pull. An intermediate element, which can be loaded in a pressure direction by a pressure rod in the selector lever acts upon an upper edge of the locking element constructed as a lever. This permits a mechanical locking using only one swivellable locking element. The mechanical locking is secure with respect to misuse.

15 Claims, 2 Drawing Sheets

ARRANGEMENT FOR LOCKING THE IGNITION KEY OF A MOTOR VEHICLE USING THE SELECTOR LEVER OF AN AUTOMATIC TRANSMISSION

BACKGROUND AND SUMMARY OF THE INVENTION

This invention is based on an arrangement for locking the ignition key of a motor vehicle using the selector lever of an automatic transmission. A swivellable selector lever of a motor vehicle automatic transmission is provided which, in a selecting position, can be locked by a spring-loaded pressure rod longitudinally guided in the lever and can be released from the engagement by being pressed down. A locking element is provided in the ignition lock which, by way of a cable pull, is connected with a swivellable locking element on the selector lever.

This type of a mechanical locking arrangement is known from German Patent document DE 42 25 182 A1. A cable control of a locking element on the ignition lock is applied to a pivotally disposed lever. In a defined position of the ignition lock, the lever interacts with an angle stop of a second swivellable locking element. This second locking element has a cam contour into which a transverse pin of the pressure rod of the selector lever can engage. For locking the selector lever or the ignition key, both swivel elements and the transverse pin of the pressure rod must interact. This has the problem of adding together all of the construction-type tolerances due to the manufacturing and movement possibilities.

There is therefore needed a purely mechanically acting simple ignition key locking arrangement which has only a small number of structural members so that, on the one hand, the component expenditures are reduced and, on the other hand, the influence of component tolerances and movement tolerances is minimized.

According to the present invention, these needs are met by an arrangement for locking the ignition key of a motor vehicle. A swivellable selector lever of a motor vehicle automatic transmission is provided which, in a selecting position, can be locked by a spring-loaded pressure rod longitudinally guided in the lever and can be released from the engagement by being pressed down. A locking element is provided in the ignition lock which, by way of a cable pull, is connected with a swivellable locking element on the selector lever. The locking element and the selector lever interact by way of a guideway on one of the two components and a guide element on the other component. The pressure rod acts upon the locking element by way of an intermediate element longitudinally guided in the selector lever.

If the swivellable locking element interacts directly by way of a guide element and a guideway with the selector lever, and the pressure rod of the selector lever acts by way of a longitudinally guided intermediate element directly on the locking element, it becomes possible to provide a mechanical locking using only one swivellable component in addition to the selector lever so that the entire locking operation is subject to fewer tolerances. This results in a simply installed mechanical locking device which requires few components and which is secure with respect to usage errors and unauthorized use.

If the swivellable locking element is constructed as a lever, whose one lever arm is acted upon by the pressure rod or the intermediate element and on whose other lever arm a cable pull is applied, unauthorized or misuse by an unintentional actuation of the pressure rod is prevented because this would result in a pulling effect on the cable pull. An upsetting of the cable pull by actuating the pressure rod is excluded.

By constructing the guideway with a curved section having two opposite guiding edges, between which the guide lengthening is guided with only a slight amount of play, a forced guiding is obtained between the selector lever and the locking element by which an unauthorized swivelling of the locking element into the locking position is prevented.

The guideway and the guide element advantageously interact along the whole swivel range of the selector lever so that an unauthorized guiding-apart of the two guide elements is not possible in any operating position of the selector lever.

Other objects, advantages and novel features of the present invention will become apparent from the following detailed description of the invention when considered in conjunction with the accompanying drawings.

DETAILED DESCRIPTION OF THE INVENTION

Figure 1:
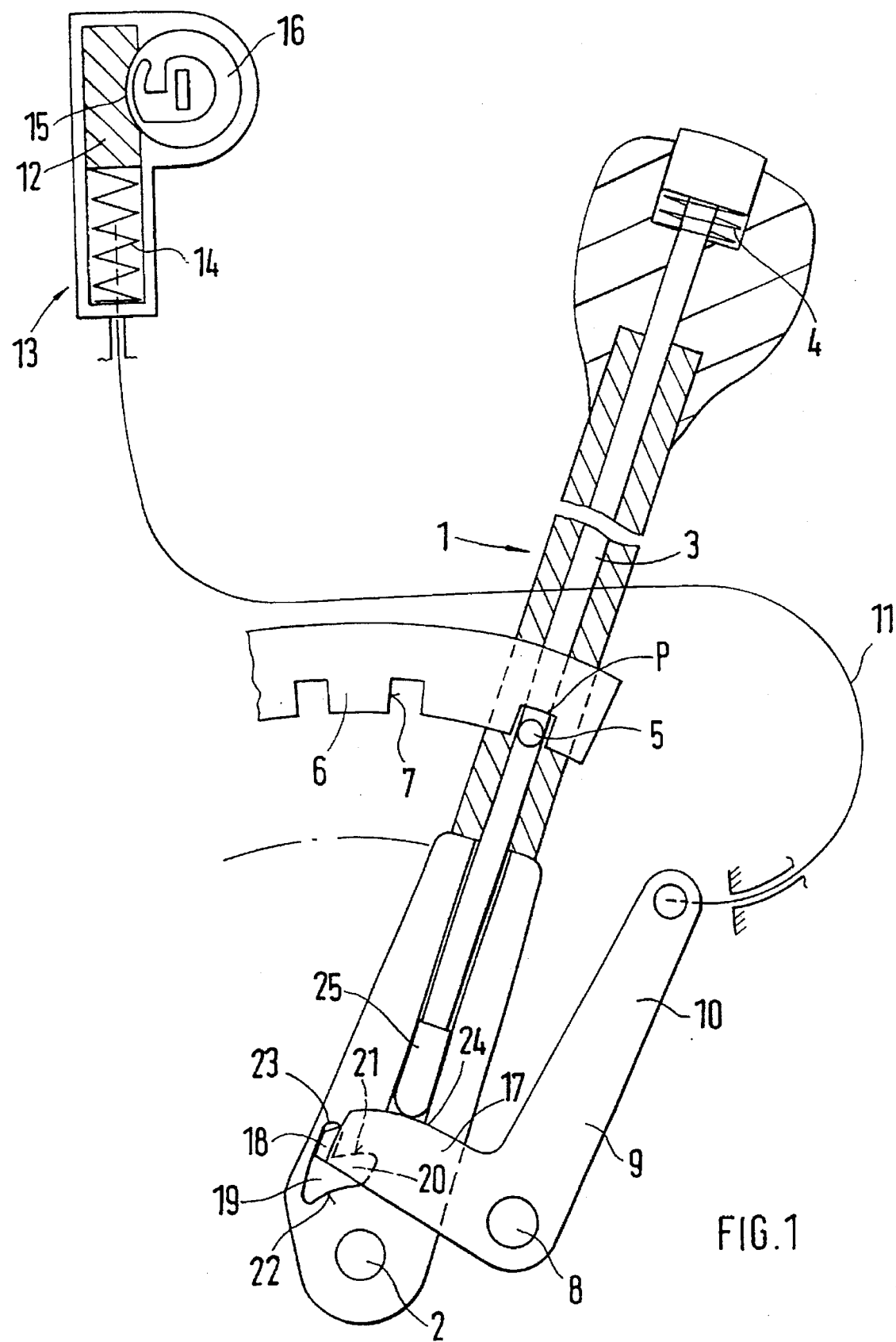
FIG. 1 is a simplified, partially sectional representation of a selector lever and an ignition key in the locked condition.

A selector lever 1 of an automatic transmission is swivellably disposed in a vehicle-body-fixed swivel shaft 2. In the selector lever 1, a pressure rod 3 is guided in an axially movable manner. The pressure rod 3 is acted upon by a spring 4 against the operating direction. On the pressure rod 3, a locking pin 5 is mounted which interacts with a detent profile 6. The detent profile 6 is provided with a plurality of detent grooves 7 into which the locking pin 5 engages in a locking manner in the different swivel positions which correspond to respective gear positions (P, N, R, D, 1, 2, 3) of the transmission (not shown).

A locking element 9 is swivellably disposed on a second vehicle-body-fixed swivel shaft 8. The second swivel shaft 8 is constructed in parallel to the first swivel shaft 2. The locking element 9 is constructed as a lever. On one lever arm 10 of the locking element 9, a cable pull 11 is fastened. The other end of the cable pull 11 is fastened on a locking element 12 in the ignition lock 13. In the ignition lock 13, a pressure spring 14 is arranged which acts upon the locking element an acts upon the cable pull 11 in the pulling direction. The locking element 12 has a locking groove 15 into which the cylinder 16 can engage when the locking element 12 is in its upper end position. In the upper end position of the locking element 12, the cylinder 16 is freely rotatable and, in addition to the free rotating of the cylinder 16, the withdrawal of the ignition key, which is not shown, is also possible in a defined position.

On the second lever arm 17 of the locking element 9, a bent guide nose 18 is constructed. The guide nose 18 engages in a guideway 19 on the selector lever 1. This guideway 19 has a curved section 20 having an upper guiding edge 21 and a lower guiding edge 22. A locking section 23 starts out from this curved section 20, in which locking section the guide nose 18 is situated in the position of the selector lever and the ignition key shown in FIG. 1.

An intermediate element 25, which is longitudinally guided in the selector lever 1, presses on the curved upper edge 24 of the second lever arm 17. In the position of the ignition key 13 illustrated in FIG. 1, the locking element 12 is in its upper end position which is the locking position.

The selector lever 1 is in the shift position P which corresponds to the parking position of the transmission. In this position of the selector lever 1, the intermediate element 25 rests on the second lever arm 17 of the second locking element 9. At the same time, the pressure rod 3 rests on the top side of the intermediate element 25. The locking pin 5 engages in the detent groove 7 corresponding to shift position P. A swivelling of the selector lever 1 is not possible in this shift position because, on the one hand, the guide nose 18 in the locking section 23 prevents a swivelling. At the same time, a disengaging of the locking pin 5 from the detent groove by pressing down the pressure rod 3 required for the swivelling of the selector lever 1 is not possible because a locking takes place by way of the resting of the pressure rod 3 on the intermediate element 25 and its resting on the upper edge 24 of the second lever arm 17. A swivelling of the locking element 9 by pressing down the pressure rod 3 is prevented by the cable pull 11 tensioned in the locking position of the locking element 12.

Figure 2:
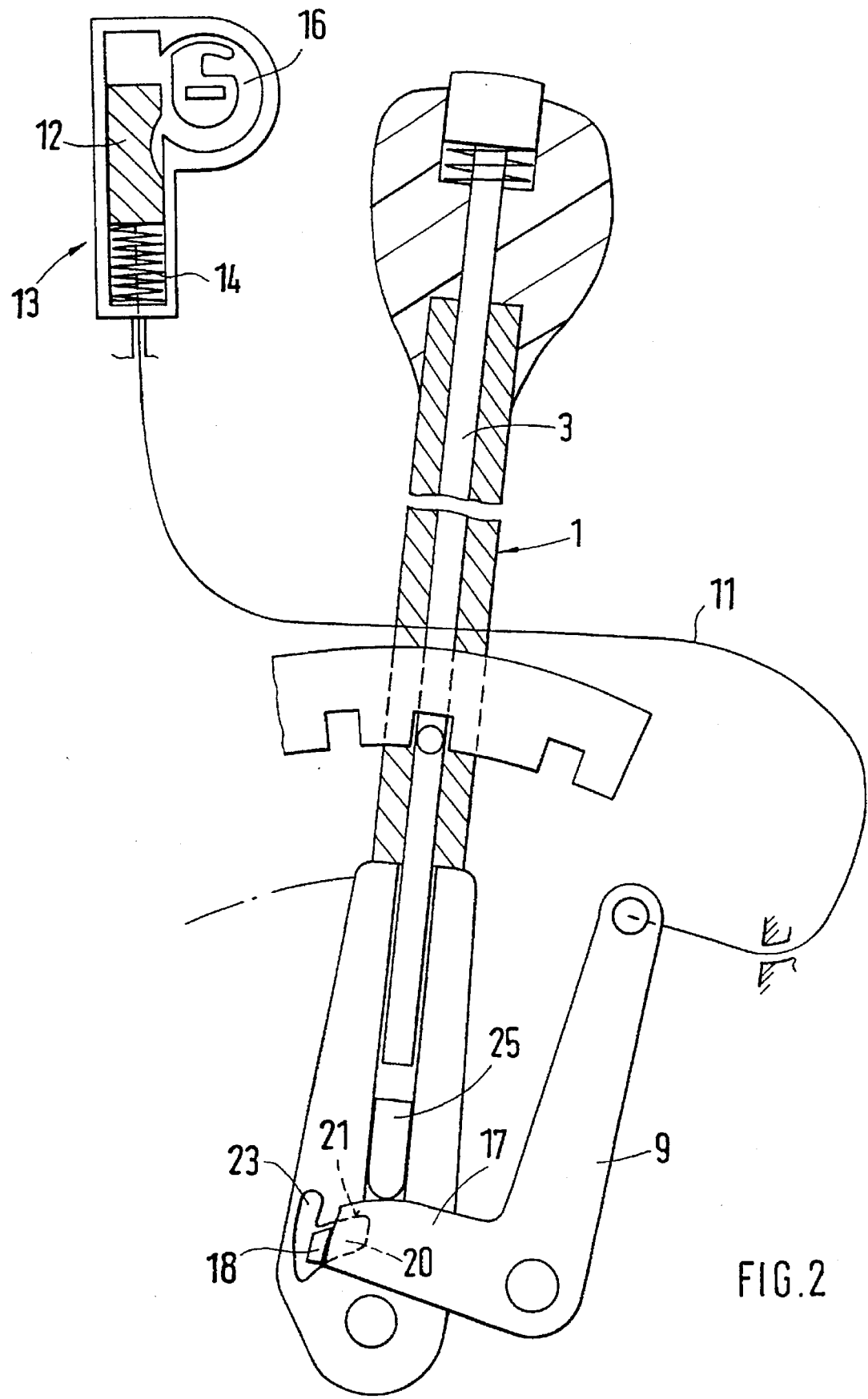
FIG. 2 is a simplified representation of the selector lever and the ignition key in an unlocked position.

In the unlocked position of the ignition key 13 and the selector lever 1 illustrated in FIG. 2, after the rotation of the cylinder 16, the locking element 12 will be freely movable. By pressing the pressure rod 3, the second lever arm 17 is pressed downward by way of the intermediate element 25 so that the guide nose 18 moves from the area of the locking section 23 into the area of the curved section 20. This permits a swivelling of the selector lever 1. By means of the upper guiding edge 21 of the curved section 20, a swivelling back of the locking element 9 is prevented so that the locking element 12 is always pulled downward by way of the cable pull 11 against the effect of the pressure spring 14. A rotating-back of the cylinder 16 into an ignition position, in which a withdrawal of the ignition key is possible, is thus prevented. A rotating-back of the cylinder 16 into this end position becomes possible again only when the selector lever 3 is swivelled back into position P and the pressure rod 3 is relieved. Thus, the intermediate element 25 is relieved so that, because of the effect of the pressure spring 14, the locking element 9 is withdrawn by way of the cable pull 11. As a result, the guide nose 18 comes into the range of the locking section 23 in which a complete withdrawal of the locking element 9 or a pressing-back of the locking element 12 into its upper end position becomes possible.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A locking arrangement for an ignition key of a motor vehicle having an automatic transmission, comprising:
   a swivellable selector lever for the automatic transmission;
   a spring-loaded pressure rod longitudinally guided within the selector lever, said selector lever being locked in a selecting position via the spring-loaded pressure rod and being released from the selected position by pressing downward on the spring-loaded pressure rod;
   a ignition locking element provided in an ignition lock for the ignition key;
   a swivellable lever locking element provided on the selector lever;
   a cable pull coupling at one end with the ignition locking element in the ignition lock and at another end being directly connected to the swivellable lever locking element;
   wherein a guideway is provided in one of the swivellable lever locking element and the selector lever and a guide element is provided on the other of the swivellable lever locking element and the selector lever, said swivellable lever locking element and selector lever directly interacting with each other via the guideway and the guide element; and
   wherein an intermediate element is arranged so as to be longitudinally guided in the selector lever, said pressure rod acting upon the swivellable lever locking element via the intermediate element.

2. An arrangement according to claim 1, wherein the swivellable lever locking element is a lever having one lever arm interacting with the selector lever and another lever arm connected to the cable pull.

3. An arrangement according to claim 2, wherein the intermediate element acts upon said one lever arm of the swivellable lever locking element which interacts with the selector lever.

4. An arrangement according to claim 2, wherein the intermediate element acts upon said one lever arm of the swivellable lever locking element such that via an operation of the pressure rod when said pressure rod, said intermediate element and said swivellable lever locking element are operatively connected, provides a pulling force on said cable pull.

5. An arrangement according to claim 3, wherein the intermediate element acts upon said one lever arm of the swivellable lever locking element such that via an operation of the pressure rod when said pressure rod, said intermediate element and said swivellable lever locking element are operatively connected, provides a pulling force on said cable pull.

6. An arrangement according claim 1, wherein the guideway includes a curved section having two opposite guiding edges between which the guide element is guided with an amount of play, and wherein the guideway further includes a bent locking section.

7. An arrangement according claim 2, wherein the guideway includes a curved section having two opposite guiding edges between which the guide element is guided with an amount of play, and wherein the guideway further includes a bent locking section.

8. An arrangement according claim 3, wherein the guideway includes a curved section having two opposite guiding edges between which the guide element is guided with an amount of play, and wherein the guideway further includes a bent locking section.

9. An arrangement according claim 4, wherein the guideway includes a curved section having two opposite guiding edges between which the guide element is guided with an amount of play, and wherein the guideway further includes a bent locking section.

10. An arrangement according claim 5, wherein the guideway includes a curved section having two opposite guiding edges between which the guide element is guided with an amount of play, and wherein the guideway further includes a bent locking section.

11. An arrangement according to claim 1, wherein the guideway and the guide element interact along an entire swivel range for the selector lever.

12. An arrangement according to claim 2, wherein the guideway and the guide element interact along an entire swivel range for the selector lever.

13. An arrangement according to claim 3, wherein the guideway and the guide element interact along an entire swivel range for the selector lever.

14. An arrangement according to claim 4, wherein the guideway and the guide element interact along an entire swivel range for the selector lever.

15. An arrangement according to claim 5, wherein the guideway and the guide element interact along an entire swivel range for the selector lever.

* * * * *